United States Patent [19]

Horiuchi et al.

[11] Patent Number: 4,856,163
[45] Date of Patent: Aug. 15, 1989

[54] COMBUSTOR OF HIGH PRESSURE BURNER FOR ROCKET ENGINE AND METHOD OF FABRICATION THEREOF

[75] Inventors: Ryo Horiuchi, Urayasu; Satoshi Saito, Yokohama; Koichi Suzuki, Tokorozawa; Kazuyuki Higashino, Sayama, all of Japan

[73] Assignees: Astronautical Science; Ishikawajima-Harima Jukogyo Kabushiki Kaisha, both of Japan

[21] Appl. No.: 171,856

[22] Filed: Mar. 22, 1988

[30] Foreign Application Priority Data

Mar. 26, 1987 [JP] Japan .................................. 62-70230

[51] Int. Cl.$^4$ ................................................ F02K 9/64
[52] U.S. Cl. .................................... 29/157 C; 60/267; 60/271; 228/183; 228/193
[58] Field of Search ............... 29/157 C; 60/260, 267, 60/271; 239/127.1, 127.3; 228/174, 183, 193

[56] References Cited

U.S. PATENT DOCUMENTS

| | | | |
|---|---|---|---|
| 2,968,918 | 1/1961 | Denison | 29/157 C |
| 3,224,678 | 12/1965 | Rosman | 29/157 C |
| 3,249,989 | 5/1966 | Robinson | 29/157 C |
| 3,595,025 | 7/1971 | Stockel et al. | 29/157 C |
| 3,605,412 | 9/1971 | Stockel | 60/260 |
| 3,630,449 | 12/1971 | Butler | 239/127.1 |
| 4,582,678 | 4/1986 | Niino et al. | 29/157 C |
| 4,703,620 | 11/1987 | Niino et al. | 60/260 |

Primary Examiner—Louis J. Casaregola

[57] ABSTRACT

An inner tube tube an outer surface of which is machined to define regerative coolant grooves for flowing a coolant to cool a combustor is split at a throat into upper and lower portions which in turn are fitted into an outer tube fabricated as a unitary structure. The upper and lower inner tube portions and the inner and outer tubes are integrally joined together.

2 Claims, 8 Drawing Sheets

COMBUSTOR OF HIGH PRESSURE BURNER FOR ROCKET ENGINE AND METHOD OF FABRICATION THEREOF

BACKGROUND OF THE INVENTION

The present invention relates to a combustor of a high pressure burner for a regenerative cooling type rocket engine and a method of fabrication thereof.

A conventional combustor of a high pressure burner for a regenerative cooling tuype rocket engine comprises an inner tube 2 with a throat 3 as shown in FIGS. 7 and 8. A plurality of projections 2' radially extend from the outer periphery of the inner tube 2 to define regenerative coolant grooves 4. Because of the throat 3 which is reduced in diameter, two-piece divided semicylindrical outer tubes 1a and 1b are fitted over the inner tube 2 and joined therewith through the projections 2' so as to support pressure in the grooves 4 and combustion pressure by the outer tubes 1a and 1b.

The conventional combustor of the type described above is fabricated by electroforming, powder infiltration, hydrostatic forming (CIP method), diffused junction or the like.

In fabrication of a combustor by electroforming, regenerative coolant grooves 4 are machined at the outer periphery of the inner tube 2 made of a Cu alloy. Cu is electroformed through an intermediate plated layer a made of Cu, Ag, Mo, Au or the like over the outer periphery of the inner tube 2, whereby the outer tube 1 is defined. The combustor thus fabricated is subjected to various kinds of tests.

In fabrication of the combustor by powder infiltration, as shown in FIGS. 10 and 11 illustrating copper powder infiltration, a copper inner tube 1 is formed at its outer periphery with the regenerative coolant grooves 4 into which water-soluble core b is filled. Two-piece divided semicylindrical stainless-steel outer tubes 1a and 1b are fitted over the inner tube 2 through a copper powder layer c and the whole structure is heated to melt the copper powder layer so as to join the outer tubes 1a and 1b with the inner tube 2. Thereafter, the two-piece divided semicylindrical outer tubes 1a and 1b are securely joined together. The combustor thus fabricated is subjected to various kinds of tests.

In fabrication of a combustor by hydrostatic forming (CIP method), as shown in FIGS. 12 and 13, an alloy d having a low melting point is filled into each of the regenerative coolant grooves 4 on the inner tube 2 and a rubber mold e is fitted over the tube 2. Thereafter copper powder f is filled into a space defined between the mold e and the inner tube 2. After the completion of the hydrostatic forming, the low-melting point alloy d is removed and then sintering is carried out, thereby forming a copper sintered tube g. Next two-piece divided semicylindrical outer tubes 1a and 1b are fitted over the tube g and are joined together by welding or the like. The combustor thus fabricated is subjected to various kinds of tests.

In fabrication of a combustor by diffused junction, as shown in FIGS. 14 and 15, the two-piece divided outer tubes 1a and 1b are fitted over the inner tube 2 with the regenerative coolant grooves 4 machined thereon and then the inner and outer tubes are tightened by jigs disposed on the sides of the inner and outer tubes, respectively. Argon gas is introduced into the combustor and the coolant grooves and the whole structure is heated in a hearth-treatment furnace so that due to force produced by the difference in thermal expansion between the inner and outer jigs and pressure of the argon gas, the inner tube 2 and the outer tubes 1a and 1b are deformed and rigidly joined together. That is, due to mutual diffusion of metal atoms in the vicinity of the abutments, the inner tube 2 and the outer tubes 1a and 1b are integrally joined together. Thereafter, a joint band 5 is fitted around the junction between the outer tubes 1a and 1b and then is welded to them.

In any of the conventional combustors except those fabricated by electroforming, due to the fact that the inner tube 2 is a unitary structure and has a throat 3 which is reduced in diameter, the two-piece divided outer tubes 1a and 1b are fited over the inner tube 2 and are welded together. As a result, the outer tube means which is to be one of the most important element for strength resistance of the combustor may be structurally problematic in assured strength and reliable quality. Furthermore, in the combustors fabricated by powder infiltration, hydrostatic forming and diffused junction except those fabricated by electroforming, due to the fact that two-piece divided outer tubes 1a and 1b are fitted over the inner tube 2 and joined together by welding or the like, fabrication steps are increased in number, resulting in increase in cost and fabrication period. In the combustor made by electroforming, there exists problems that a long fabrication period is required and that control in thickness of plated layer is extremely difficult.

In view of the above, a primary object of the present invention is to provide a combustor of a high pressure burner for a rocket engine an outer tube of which is fabricated as a unitary structure for stabilized and assured strength and for fabrication at low costs within a short time interval.

The above and other objects, effects, features and advantages of the present invention will become more apparent from the following description of some preferred embodiments thereof taken in conjunction with the accompanying drawings.

DETAILED DESCRIPTION OF THE PREFERRED EMBODIMENTS

Figure 1:
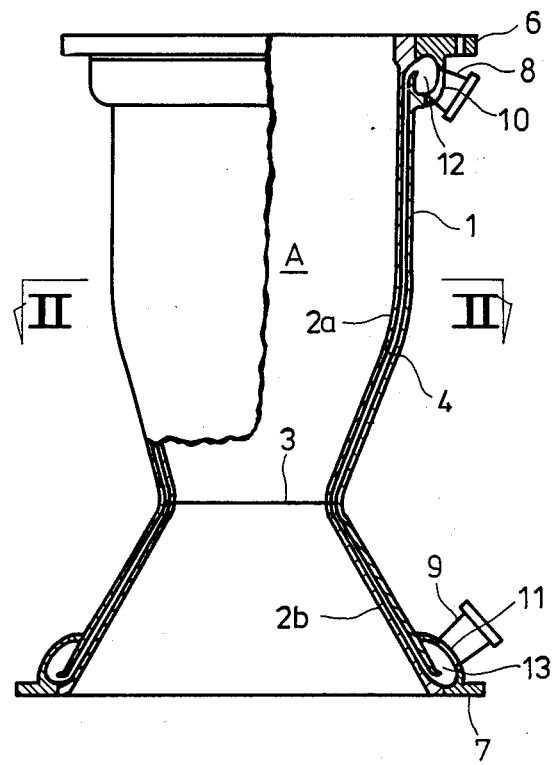
FIG. 1 is a partly cutaway side view of a preferred embodiment of a combustor in accordance with the present invention.
Figure 2:
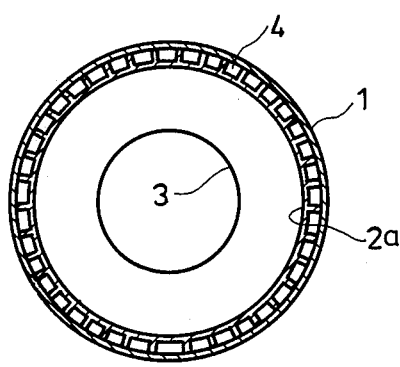
FIG. 2 is a sectional view taken along the line II—II in FIG. 1.

FIGS. 1 and 2 show a preferred embodiment of a combustor in accordance with the present invention. An inner tube 2 has a plurality of regenerative coolant grooves 4 machined in parallel with the axis of the inner tube 2 at the periphery thereof and has a throat 3. The inner tube 2 is divided perpendicular to its axis at the throat 3 into an upper inner tube 2a and a lower inner tube 2b. The upper and lower inner tubes 2a and 2b are inserted from the upper and lower ends, respectively, of an outer tube 1 which is a unitary structure and has a reduced-diameter portion corresponding to the throat 3 of the inner tube 2 such that the upper and lower inner tubes 2a and 2b are made into intimate contact with each other at the throat 3 and are joined together and the intersurfaces between the inner tubes 2a and 2b and the outer tube 1 are joined together into a unitary structure to define a combustor A with the regenerative coolant grooves. Reference numeral 6 represents an upper flange; 7, a lower flange; 8, a regenerative coolant discharge flange; 9, a regenerative coolant inlet flange; 10, an upper manifold; 11, a lower manifold; 12, an upper manifold space; and 13, a lower manifold space.

Combustion gases flow through the combustor downwardly axially of the combustor A and the regenerative coolant (liquefied hydrogen) flows into the inlet flange 9, rises through the regenerative coolant grooves 4 and flows out of the discharge flange 8 so as to be used as, say, gases for driving a turbine. Upon combustion in the combustor A, the pressure in the combustor and the pressures in the regenerative coolant grooves 4 are supported by the outer tube 1. Since the outer tube 1 has a unitary structure, it supports the strength as a pressure-withstanding member. Unlike the conventional combustors, the outer tube 1 is not constructed as two-piece divided members welded together so that the quality of the outer tube 1 can be stabilized.

Next a preferred embodiment for fabrication of a combustor in accordance with the present invention will be described. It is assumed that the inner tube is made of copper containing no oxygen while the outer tube is made of SUS.

Figure 3:
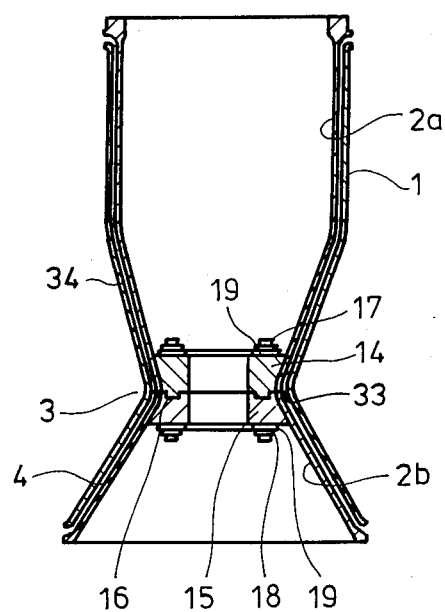
FIGS. 3 and 4 are views illustrating a diffused junction step in fabrication of a combustor in accordance with the present invention.

First, as shown in FIG. 3, the upper and lower inner tubes 2a and 2b divided at the throat 3 are pressure-fitted into the outer tube 1 of a unitary structure and an inner-tube upper flange 14 is attached to the lower inner side of the upper inner tube 2a while an inner-tube lower flange 15 is attached to the upper inner side of the lower inner tube 2b. A copper seal ring 16 is clamped between the flanges 14 and 15 and the intimate contact between the upper and lower inner tubes 2a and 2b at the throat 3 is confirmed by size inspection. The inner-tube upper and lower flanges 14 and 15 at the throat 3 are tightened with clamping bolts and nuts 17 and 18. Reference numeral 19 represents a washer.

Figure 4:
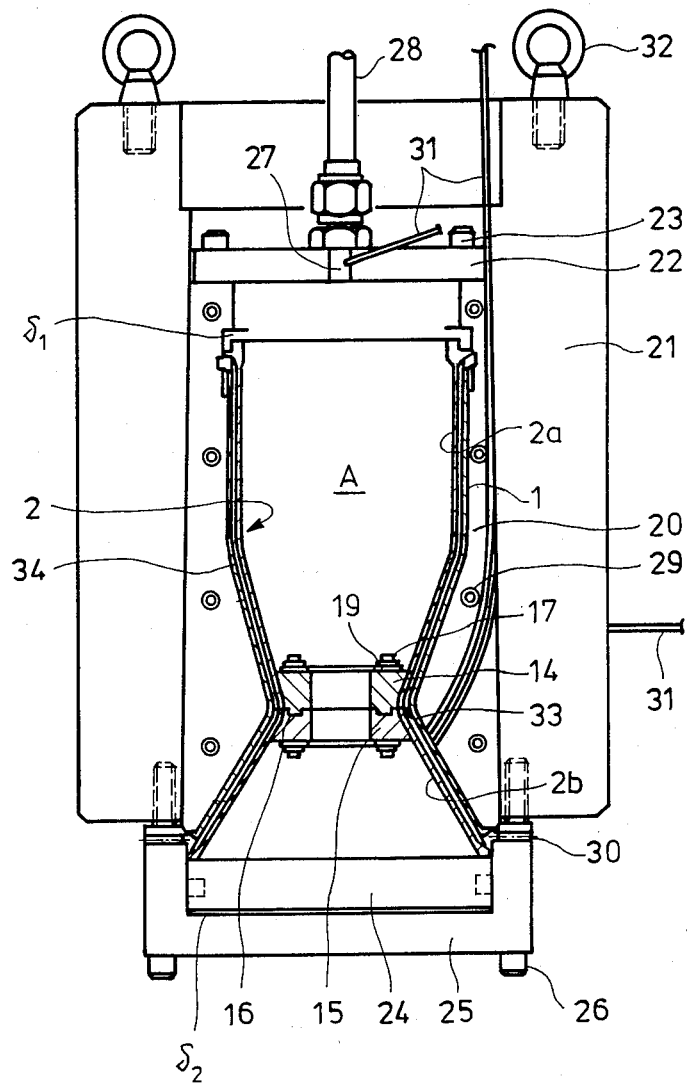

Thereafter, as shown in FIG. 4, two-piece divided sleeves 20 are fitted over the outer tube 1 as jigs for securely holding the outer tube 1 in position and a sleeve-retaining tapered cylinder 21 whose inner lower portion is diverged outwardly is fitted as a weight over the two-splitted sleeves 20 for neat abutment therebetween. An upper blind plate 22 is attached to the upper end of the sleeve 20 with jig-clamping bolts 23 while a lower blind plate 25 is attached through a spacer 24 to the lower end of the cylinder 21 with jig-clamping bolts 26. Furthermore, an argon gas inlet 27 is formed through the upper blind plate 25 and is communicated with an argon gas injection pipe 28 so that argon gas can be sealed in the inner tube 2. Reference numeral 29 denotes clamping bolts arranged in the circumferential direction; 30, an argon gas discharge port for discharging argon gas which is subjected to the forced circulation so that the argon gas flows sufficiently through the regenerative coolant grooves 4 upon the diffused junction; 31, a temperature sensor; 32, eye bolts used when tapered cylinder 20 is displaced; and $\delta_1$ and $\delta_2$, clearances between the combustor and the jigs.

When the jigs are attached as shown in FIG. 4, the argon gas is introduced through the argon gas injection pipe 28 into the combustor and the regenerative coolant grooves 4. Thereafter, the above-described assembly is lifted through the eye bolts 32 and is charged into a heat-treatment furnace so that the assembly is heated at a predetermined temperature for a predetermined time. As a result, the pressure is exerted to the abutment surface 33 between the upper and lower inner tubes 2a and 2b by utilizing the difference in coefficient of linear expansion between the clamping bolts 17 and the inner tubes 2. Furthermore, the pressure of the introduced argon gas is exerted. As a result, great forces are imparted to the abutment surface 33 between the inner upper and lower tubes 2a and 2b and the abutment surfaces 34 between the inner and outer tubes 2 and 1 so that they are pressed against each other. Consequently, the abutment surfaces are subjected to elastic or plastic deformations and are made into intimate contact with each other. Therefore, the metallic atoms in the vicinity of the abutment surfaces diffuse mutually so that the abutment surface 33 between the upper and lower inner tubes 2a and 2b and the abutment surfaces 34 between the inner and outer tubes 2 and 1 are simultaneously diffused joined integrally.

Figure 5:
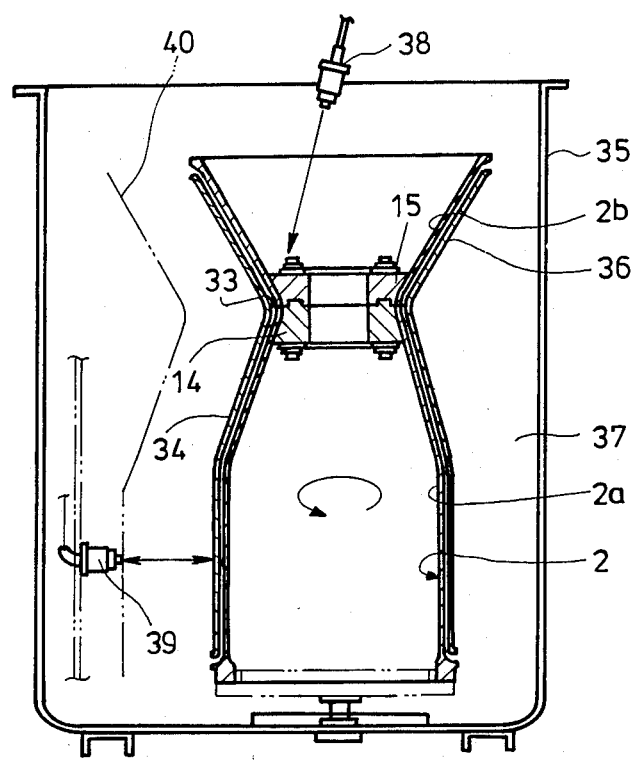
FIG. 5 is a view illustrating confirmation of junction conditions after the diffused junction.

After the inner tubes 2a and 2b with each other and the inner and outer tubes 2 and 1 are rigidly diffused-joined together as described above, the jigs such as the sleeves 20, the upper and lower blind plates 22 and 25 and the tapered cylinder 21 and so on are removed. Thereafter, the abutment surfaces 33 between the inner and outer tubes 2 and 1 are inspected and the air-tightness and pressure tests of the regenerative coolant grooves 4 are carried out. Thus the combustor is fabricated. More particularly, in inspection of the abutment surface 33 between the inner and outer tubes 2 and 1, as shown in FIG. 5, the combustor thus fabricated is turned upside down and immersed into a medium (water) in a bath 35 as a test piece 36 in order to carry out the ultrasonic inspections of the abutment surface between the inner and outer tubes. In inspection of the abutment surfaces 33 between the inner tubes 2a and 2b, an ultrasonic probe 38 for inspecting the abutment surface is positioned as shown in FIG. 5. In inspection of the abutment surfaces between the inner and outer tubes 2 and 1, an ultrasonic probe 39 is scanned along the scanning lines in parallel with the axis of the outer tube 1. When the junction surface conditions are found to be satisfactory after the inspections, the upper and lower flanges 14 and 15 at the throat 3 between the upper and lower inner tubes 2a and 2b are removed and the combustor is subjected to a blend finishing.

In an air-tightness test of the regenerative coolant grooves 4, helium gas is introduced into each of the regenerative coolant grooves 4 and its pressure is increased to find out whether or not the helium gas leaks into the throat 3.

Figure 6:
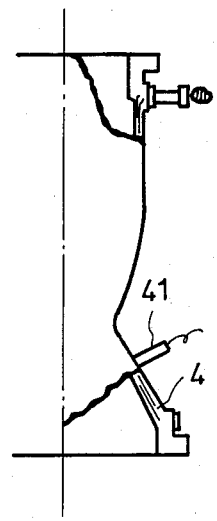
FIG. 6 is a view illustrating pressure test in a regenerative coolant groove.
Figure 7:
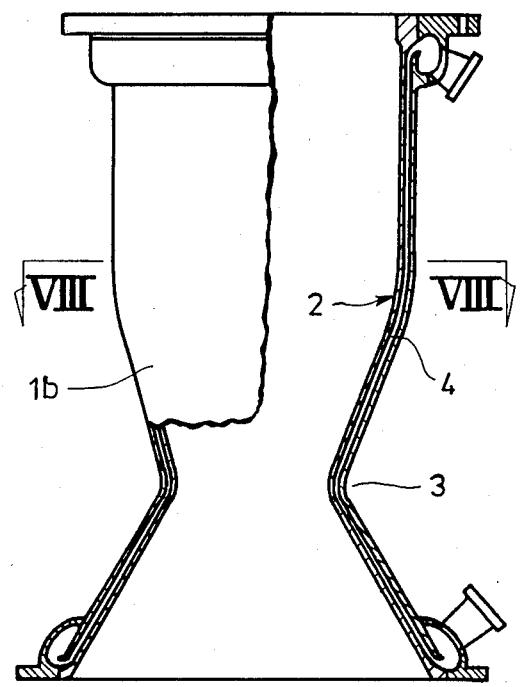
FIG. 7 is a partly cutaway side view of a conventional combustor.
Figure 8:
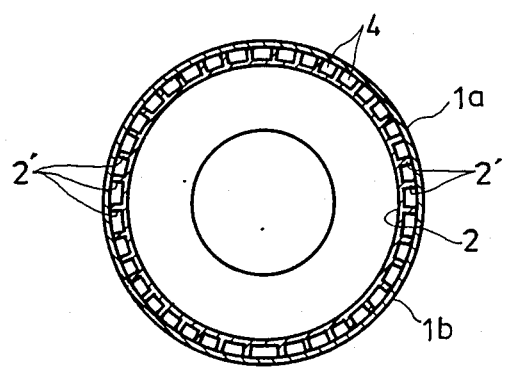
FIG. 8 is a sectional view taken along the line VIII—VIII in FIG. 7.
Figure 9:
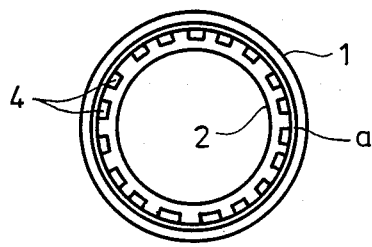
FIGS. 9, 10 , 12 and 14 are views illustrating conventional methods for fabrication of combustors.
Figure 10:
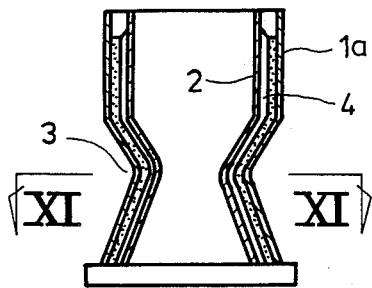
Figure 11:
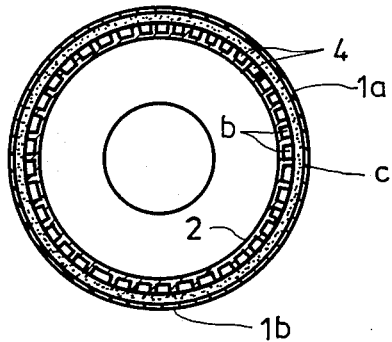
FIG. 11 is a sectional view taken along the line XI—XI in FIG. 10.
Figure 12:
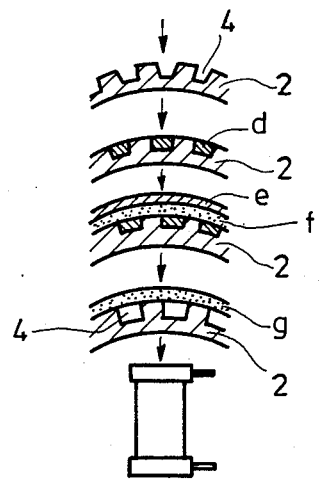
Figure 13:
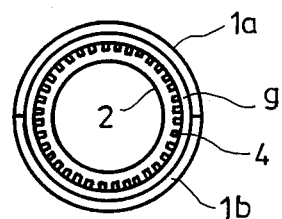
FIG. 13 is a sectional view of the combustor fabricated according to the method shown in FIG. 12.
Figure 14:
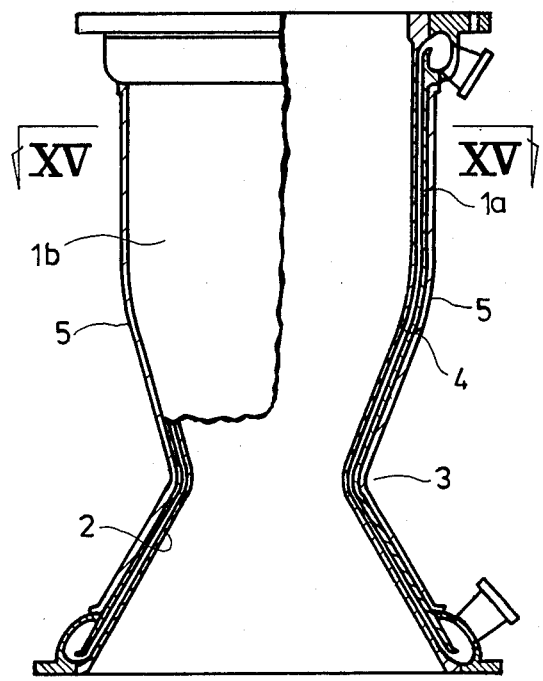
Figure 15:
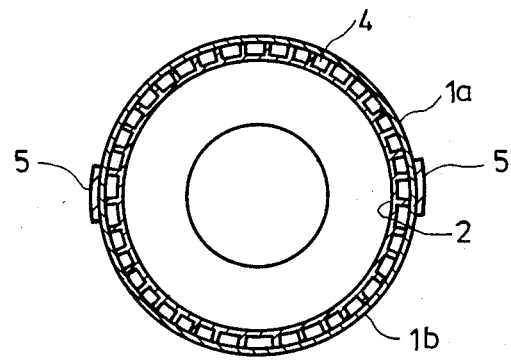
FIG. 15 is a sectional view taken along the line XV—XV in FIG. 14.

In a pressure test of the regenerative coolant grooves 4, hydraulic pressure is exerted to each of the regenerative coolant grooves 4 as shown in FIG. 6 and an AE (acoustic emission) sensor 41 is attached to the outer surface of the outer tube 1. Thereafter, the hydraulic pressure is increased while an inspector monitors the output of the AE sensor 41 to confirm that the diffused junction surfaces are not separated.

As described above, according to the present invention, the outer tube which is to be one of the very important high strength elements of the high pressure burner is made as a unitary structure; the inner tube having regenerative coolant grooves formed at the outer periphery thereof is split at the throat into upper and lower inner tubes which in turn are fitted into the outer tube such that the upper and lower inner tubes are made into contact with each other at the throat; the upper and lower inner tubes are joined simultaneous with the joining between the inner and outer tubes by the diffused junction method; and thereafter, the junction conditions, the air-tightness and the pressure proof of the regenerative coolant grooves are confirmed so that the following excellent effects can be achieved.

(I) The outer tube which is to be a strength element for supporting the combustion pressure and the pressure in each of the regenerative coolant grooves is fabricated as a unitary structure so that a satisfactory degree of strength can be supported. Furthermore, when the outer tube is fabricated, it is not subjected to any welding process so that a satisfactory degree of quality can be ensured and a high degree of reliability can be also assured.

(II) By the diffused junction process carried out only one time, the abutment surfaces between the upper and inner lower tubes as well as the abutment surfaces between the outer and inner tubes are securely joined together so that the fabrication period can be shortened, fabrication cost can be reduced and mass production can be carried out because of the diffused junction process conditions being established.

(III) The junction surface inspection by the ultrasonic inspection and the pressure test by the AE sensor are established so that a satisfactory degree of quality of the combustor can be ensured.

What is claimed is:

1. A method for fabrication of a combustor of a high pressure burner for a rocket engine, which comprises providing an inner tube having a throat, machined at its outer periphery to define regenerative coolant grooves and split into upper and lower portions at said throat, press-fitting said upper and lower portions into an outer tube fabricated as a unitary structure for intimate contact with each other, tightening the upper and lower portions by jig means, securely attaching further jig means to an outer periphery of said outer tube, and rigidly joining together abutment surfaces between said upper and lower inner tube portions as well as abutment surfaces between said inner and outer tubes simultaneously by a diffused junction process.

2. The method according to claim 1 wherein, after said abutment surfaces between said upper and lower inner tube portions as well as the abutment surfaces between said outer and inner tubes are rigitly joined together simultaneously by said diffused junction process, said jig means and said further jig means are removed and conditions of diffused-joined surfaces are confirmed while air-tightness and pressure proof of said regenerative coolant grooves are confirmed.

* * * * *